INVENTORS
Frank C. Lustig
Charles H. Taylor

INVENTORS
Frank C. Lustig
Charles H. Taylor
BY McDougall,
Williams & Hersh
Attys Nov. 7, 1967     F. C. LUSTIG ET AL     3,351,254

AUTOMATIC THREADER FOR MOTION PICTURE PROJECTOR

Filed Feb. 3, 1961     3 Sheets-Sheet 3

INVENTORS
Frank C. Lustig
Charles H. Taylor
BY
Attys

United States Patent Office 3,351,254
Patented Nov. 7, 1967

3,351,254
AUTOMATIC THREADER FOR MOTION
PICTURE PROJECTOR
Frank C. Lustig and Charles H. Taylor, Chicago, Ill.,
assignors, by mesne assignments, to Minnesota Mining
and Manufacturing Company, St. Paul, Minn., a corporation of Delaware
Filed Feb. 3, 1961, Ser. No. 86,971
15 Claims. (Cl. 226—91)

This invention relates to an improved automatic threading system for a motion picture projector of the type commonly used in the home. The system of this invention relates particularly to a threading system of the type wherein the film is fed and removed continuously from a take-off reel through a sprocket and guide system into a film gate, advanced intermittently through the film gate and then guided around a second sprocket onto a take-up reel.

The principal problem encountered in providing such an automatic threading mechanism arises from the fact that the sprockets which feed the film into and withdraw it from the film gate rotate at a constant speed, whereas the claw or finger which moves the film through the film gate advances it in intermittent movements. Thus, it is essential that loops be formed in the film between each of the driving sprockets and the film gate, thereby providing enough slack to prevent binding or tearing of the film as it is moved through and away from the film gate. In the past, these loops have generally been formed manually by the projector operator, who has been required to unwind the leading edge of the film from the take-off reel and advance it through the film gate and onto the take-up reel, carefully forming the necessary loops between each of the driving sprockets and the film gate, before beginning operation of the projector.

It has, of course, long been recognized that it would be desirable to relieve the projector operator of the task of manually threading the film onto the take-up reel and forming the necessary loops therein, and a number of different automatic threading mechanisms having heretofore been proposed. None of these has, however, so far as applicants are aware, proved to be completely satisfactory, largely because of the difficulties encountered with the means provided for forming the film loops and for accommodating fluctuations in the size of such loops which occur from time to time in the showing of a single reel of film.

Prior automatic threading systems have included types with movable loop formers which can be retracted from the film path after threading, thus releasing the film from frictional contact with the loop former surfaces, thereby permitting "free breathing" of the film. Many of the apparatuses of this type require loop former surfaces above and below the film at each of the loop former stations and tend to rip the film, resulting in tearing of the film.

Other mechanisms employ driving sprockets which are located on movable axes and which permit the film to be shortened between the loop formers after it has been threaded. Still further systems have provided auxiliary guide means which are adapted to be interjected into the film path between the driving sprockets after the film has been threaded to thereby shorten the film between the loop formers.

These systems have exhibited several disadvantages among which are the requirements of relatively complicated mechanical networks which will move the loop formers in and out of the film path, will displace driving sprockets from their normal axes, or will interject auxiliary guide means into the film path. Networks of this type have proved cumbersome, require more maintenance due to the excess of movable parts, and are generally unreliable. In addition these generally complicated structures have distinct disadvantages in that they deny access to the film once it is threaded into the projector. This complicates editing since the film must be run all the way through the projector in order to reach positions in the middle of the film.

It is therefore an object of this invention to provide a motion picture projector automatic threading system which will enable the threading of the projector in a simple and reliable fashion.

It is a further object of this invention to provide an improved automatic threading system which will permit formation of loops in the film and "free breathing" of the film in the running position without the use of movable loop formers, driving sprockets located on a movable axis, and auxiliary guiding means for shortening the film length between the loop formers.

It is a further object of this invention to provide a generally uncomplicated threading system comprised of a minimum of parts, economical to manufacture and of a type requiring little maintenance.

It is an additional object of this invention to provide a threading system which has the features set forth in the foregoing objects and which also is of a nature which permits removal of the film while threaded in the projector and insertion of the film into the projector at a point intermediate its ends.

It is a still further object of this invention to provide a threading system having means operatively associated with means adapted to provide "free breathing" of the film which will enable dependable passage of the film through the film gate during the threading operation.

These and other objects of this invention will appear hereinafter, and for purposes of illustration, but not of limitation, specific embodiments of this invention are shown in the accompanying drawings in which.

Figure 1:
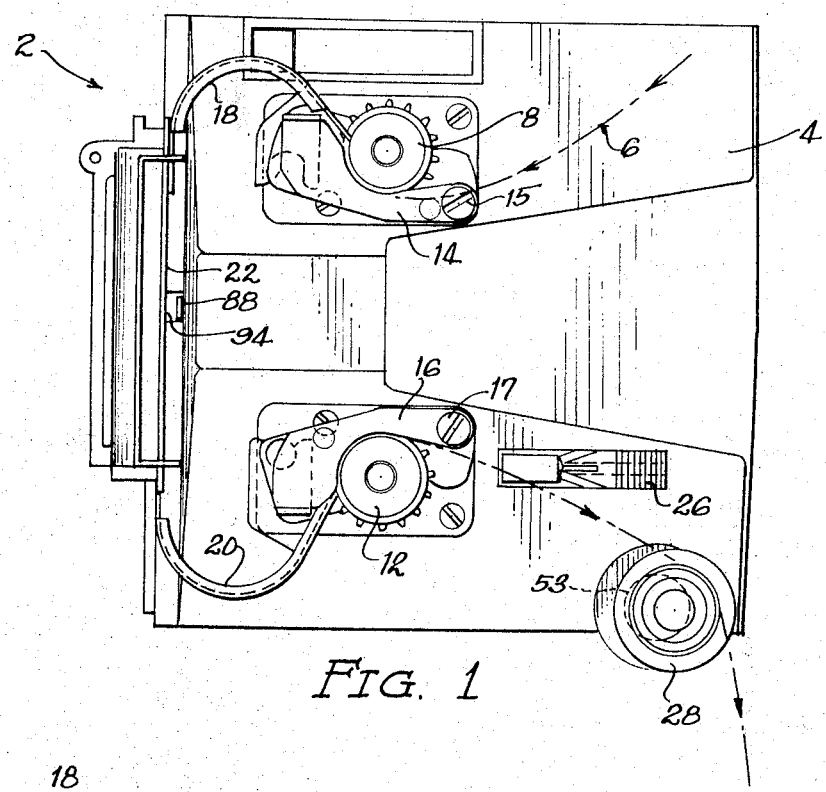
FIG. 1 is a front elevation view of the film driving mechanisms and projection aperture of a projector embodying the concepts of this invention shown in threading position with lens removed.

The apparatus of this invention may be broadly described as an automatic film threading mechanism which includes first and second stationary loop forming means located above and below a projection aperture. Associated with these loop forming means are film feeding sprockets and film receiving or removal sprockets which are located on a stationary axis. The driving apparatus for the projector is adapted to rotate the feeding and receiving means and to intermittently move film past the projection aperture, either during threading or during the showing of the film. Means associated with the driving means for the projector are adapted to cause a hesitation or reversal in the direction of rotation of the feeding sprocket, and also rotation of the receiving sprocket, which reversal or hesitation and simultaneous rotation is sufficient to shorten the length of film between the feeding and receiving means when the projector is switched from a threading to running position. This shortening of the film length thus permits "free breathing" of the film with respect to the stationary loop formers.

In the accompanying drawings, there is shown an example of a projector which embodies the basic concept of this invention. The numeral 2 generally indicates a section of the projector which includes the film gate and driving mechanisms of this invention. The section 2 includes a housing 4, and there is shown in dotted line fashion film 6 being passed through the section 2. The film 6 is driven by an upper feeding sprocket 8 past the film gate 10 and to a lower level receiving sprocket 12.

Film retainers 14 and 16, shown associated with the sprockets 8 and 12, are pivotally mounted at 15 and 17 and resiliently urged by a spring means (not shown) to the normal position shown in the drawings. Stationary loop formers 18 and 20 are located in the film path above and below gate 10.

The film gate 10 includes a stationary aperture plate 22 and a pressure plate 24 flexibly mounted on a lens assembly 25. The lens assembly will be pivotably mounted on the housing 4 and extends from the projection aperture between the sprocket wheels in a conventional fashion. It can thus be swung free of the aperture plate to provide access to this area of the mechanism.

Figure 2:
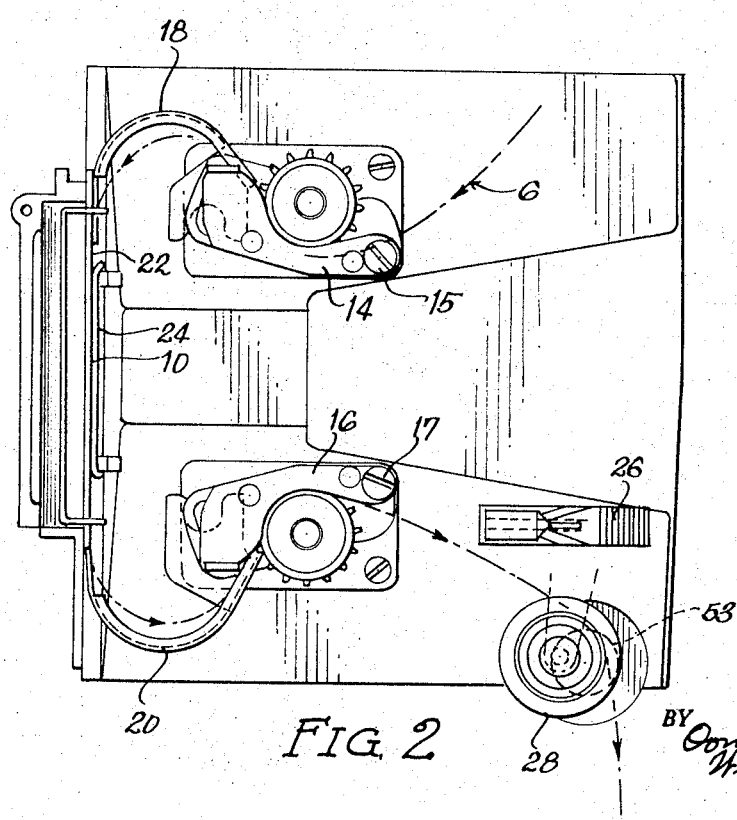
FIG. 2 is a front elevation view of the film driving mechanisms and projection aperture of a projector embodying the concepts of this invention shown in running position with lens removed.

Also shown on the front face of the housing 4 is a thread button 26 shown in the threading position in FIG. 1 and in the running position in FIG. 2. Guide roller 28 is located below the thread button 26 and is likewise shown in its threading and running positions in FIGS. 1 and 2.

Figure 3:
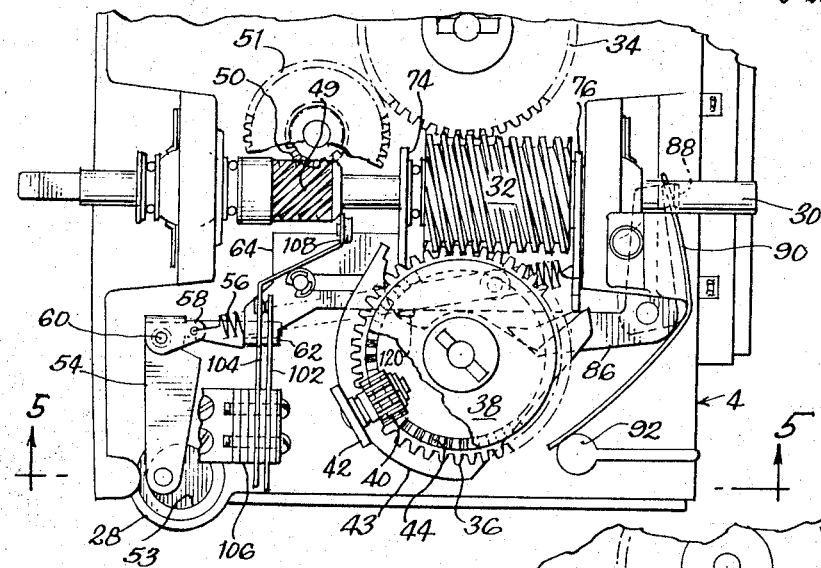
FIG. 3 is a rear elevation of the inside of a projector showing the mechanisms of this invention in threading position.
Figure 4:
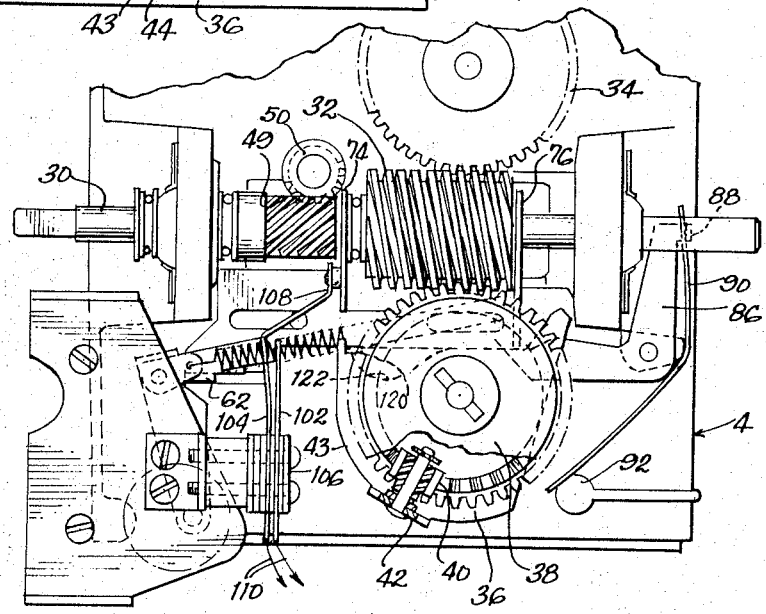
FIG. 4 is a rear elevation of the inside of a projector showing the mechanisms of this invention in running position.
Figure 5:
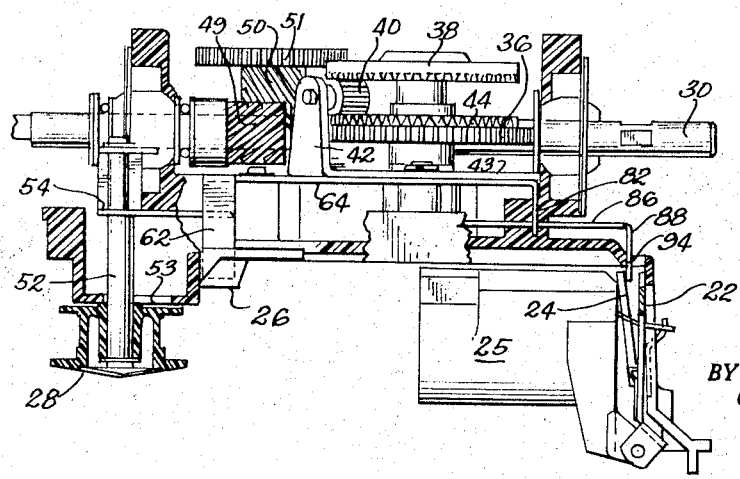
FIG. 5 is a sectional view taken about the line 5—5 of FIG. 3.
Figure 9:
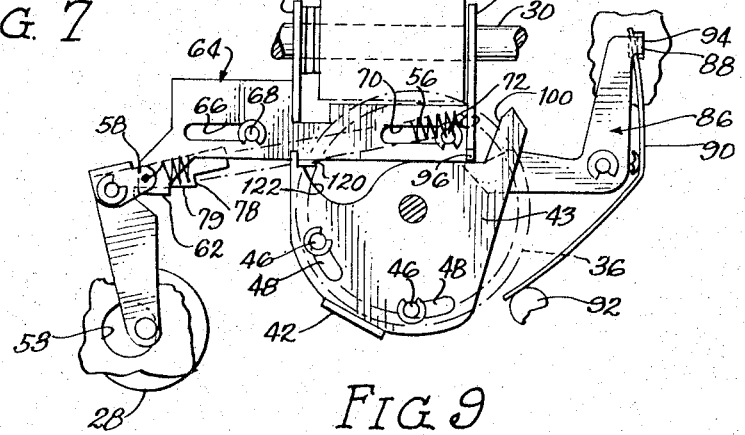
FIG. 9 is a detailed view, partly in section of the mechanisms of FIG. 4.

Referring to FIGS. 3, 4 and 5, there is shown the driving mechanisms for the projector, including a main drive shaft 30 connected to a sliding worm 32. Worm gears 34 and 36 are located on the shafts of the upper and lower sprockets 8 and 12 respectively, and are in operative engagement with the sliding worm 32. Worm gear 34 is fixed upon the shaft of the upper sprocket 8, while worm gear 36 is loosely fitted on the shaft of the lower sprocket 12. A face gear 38 is fixed to the shaft of the lower sprocket 12, and a pinion gear 40 is interposed between the face gear 38 and the worm gear 36. The pinion gear 40 is rotatably secured on an upstanding arm 42 located on a swiveling pinion bracket 43 which is freely rotatable about the axis of the lower sprocket 12. Face gear teeth 44 are provided on the worm gear 36 in order to permit engagement therewith by the pinion gear 40. The swiveling bracket 43 is retained by the pins 46 which are located in the slots 48 formed in the bracket (see FIG. 9). Associated mechanisms 49, 50 and 51 are adapted to drive other portions of the projector not directly related to this invention.

Figure 6:
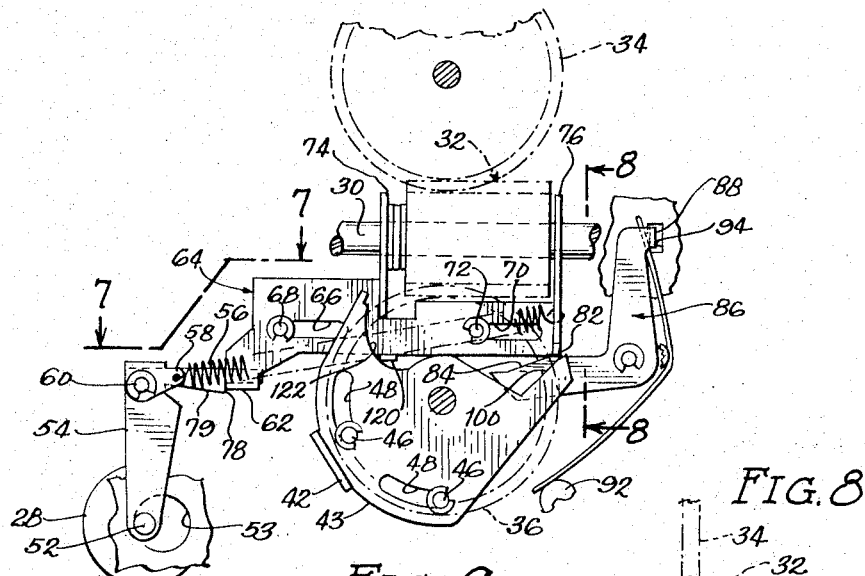
FIG. 6 is a detail view, partly in section of the mechanisms of FIG. 3.
Figure 8:
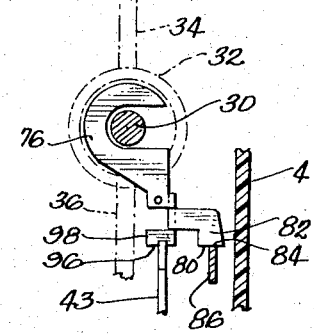
FIG. 8 is a detailed sectional view taken about the line 8—8 of FIG. 6.
Figure 7:
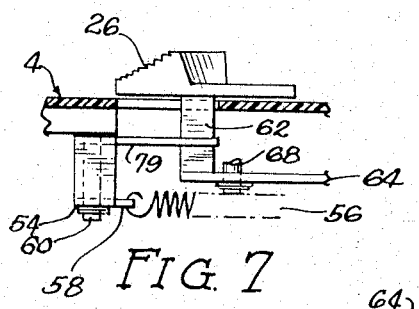
FIG. 7 is a detailed sectional view taken about the line 7—7 of FIG. 6.

Guide roller 28 is fixed to a shaft 52 which has freedom of movement within the aperture 53 located in the housing 4. A latch lever 54 is secured to an end of shaft 52 and also is provided with a spring 56 attached on an extension 58 at its other end (see FIGURES 6 through 9). The latching lever 54 is pivoted at 60 and is provided with latch means 78 located on projection 79 thereof. The thread button 26 is fixedly secured to an extension 62 formed on the sliding yoke 64. The traverse of the sliding yoke 64 is controlled by guide pins 68 and 72, which are secured to the housing 4 and extend within slots 66 and 70. Collar extensions 74 and 76 of the yoke 64 fit about the drive shaft 30 and control the movement of the sliding worm 32 which is keyed to the shaft 30. The latch means 78 is adapted to fit over the extension 62 on the sliding yoke as shown in FIG. 6.

A bearing member 80 is located on projection 82 on the yoke 64, and is adapted to bear upon bearing surface 84 located on a lift lever 86. The lever 86 is provided with abutment means 88 which extend into the film gate area through the projection housing as shown in FIG. 1. A spring 90 having one end held by the stud 92 normally urges abutment means 88 against the surface 94 of the housing 4. A projection (not shown) centrally located on the pressure plate 24 is adapted to contact the abutment means 88 when it is in the position shown in FIG. 1; that is, the threading position. Since the pressure plate 24 is flexibly mounted, it will thus be positioned away from the stationary aperture plate 22 and will provide a larger access opening for the film 6 being threaded.

A second bearing member 96 is provided on a projection 98 of the yoke 64 and is adapted to bear upon the bearing surface 100 of the oscillating pinion bracket 43.

Contacts 102 and 104 are secured to the housing 4 by the means 106. Extension 108 on the contact 104 abuts against the collar extension 74 on the sliding yoke 64. See FIGURES 3 and 4. It will be noted that the contacts are open in running position and closed in threading position. The contacts are secured to leads 110 connected to the driving motor (not shown) which enables running of the projector at threading speed when the contacts are closed and at running speed when open in a well known manner.

The operation of the automatic film threading mechanism of this invention will be described as follows:

With the projector free of film and with the intention of loading the projector the first step is to push the thread button 26 to the threading position as shown in FIG. 1. This movement causes the yoke 64, and sliding worm 32 associated therewith, to be moved to the position shown in FIG. 3. The action of the spring 56 will cause the latching lever 54 to pivot at 60 and the latch means 78 will fit over the extension 62 of the yoke 64, thus locking the yoke in the threading position. At the same time the bearing member 80 on the yoke 64 will bear upon the surface 84 on the lift lever 86. This will cause the abutment means 88 to extend into the film gate area and abut the projection on the pressure plate 24, forcing it away from the aperture plate 22 and providing a larger opening between the plates 22 and 24. Movement of the sliding yoke 64 also causes the second bearing member 96 to bear upon the bearing surface 100 of the sliding pinion bracket 43. This bearing combination causes rotation of the bracket 43 about the axis of the shaft of the lower sprocket 12 and causes the face gear and its associated pinion gear 40 to rotate. The worm gear 36 also rotates due to its engagement with the sliding worm 32. It is important to note that, with the drive motor inoperative, the face gear 38 and worm gear 36 will rotate in the same direction when the pinion bracket 43 is caused to rotate.

The drive shaft 30, when made operative, will rotate the worm gears 34 and 36 through the action of the sliding worm 32 at threading speed since the contacts 102 and 104 will be closed.

The upper sprocket 8 will be rotated in the same direction as the worm gear 34, but the lower sprocket 12 will be rotated in a direction opposing that of the worm gear 36, since the interaction of the pinion gear 40 and face gear 38 induce such opposing rotation in the shaft of the sprocket 12.

If the end of film 6 is inserted between the retaining means 14 and the sprocket 8, the film will be guided by the loop former 18 past the access provided by the plates 24 and 22 and guided by the loop former 20 between the retaining means 16 and associated sprocket means 12. The film then passes to the guide roller 53, which guide roller will be forced to the running position shown in FIG. 2 when slight pressure is exerted thereon. This pressure may be due to the film itself once it has been secured to the take-up reel or due simply to finger pressure effected by the operator. At any rate, the movement of the guide 53 to the running position causes a sequence of operations, the reverse of that described heretofore. The movement of the guide 53 is in opposition to the spring 56 and causes the latch lever 54 to rotate, thus releasing latch means 78 with respect to extension 62 on the sliding yoke 64. This permits movement of the yoke 64 to the running position as shown in FIG. 4 due to the urging of the spring 56 connected thereto. In addition, the bearing member 80 passes along the bearing surface 84, permitting the spring 90 to urge the abutment means 88 against the surface 94, thus permitting the flexibly mounted pressure plate 24 to assume its normal position with respect to the stationary plate 22. It is also obvious that the contacts 102 and 104 will be in open position and the mechanism driven at running speed.

The movement of the yoke 64 to running position further causes the sliding pinion bracket 43 to be pivoted about the shaft of the lower sprocket 12. The movement of the bracket 43 is effected through engagement of the projection 120 with the cam surface 122 formed in the edge of the bracket, this projection 120 being integral with the yoke 64. Movement to the running position causes the face gear and the worm gear 36 to rotate simultaneously in the same direction and through the same distance. This combined movement is in a direction opposing the direction of movement of the worm gear 36 due to the rotation of worm 32. However, since the face gear 38 is driven through the operation of the worm 32 in a direction opposed to that of the gear 36, the sliding movement of the yoke 64 results in a net increase in forward tangential movement of the sprocket 12 equivalent to the tangential movement of pinion gear 40. In other words, during the sliding interval, the sprocket 12 will be rotated its normal amount due to the ordinary driving action of the shaft 30 and an increased amount in the same direction due to the additional rotation of the face gear 38 effected by the sliding movement of yoke 64.

With reference to the effect of the sliding movement on the upper sprocket 8, it will be noted that the sliding of the worm 32 causes movement of the gear 34 opposing the normal driving movement. Since the gear 34 is fixed to the shaft of the sprocket 8, there will be a net decrease in rotation of the sprocket 8; that is, during the sliding interval there will be a tendency for the sprocket 8 to reverse its rotary direction. The net movement of the sprocket 8 during the sliding interval will be equal to its normal rotation during the driving movement minus the amount of tangential rotation effected by sliding worm 32.

It will thus be apparent that the sliding movement of the yoke 64 from threading to running position, effected when pressure is exerted on the guide roller 28 will result in a net shortening of the film length located between the sprockets 8 and 12; that is, the rotation of the sprocket 12 during the sliding interval will tend to pull the film through the film gate at a rate quicker than the normal threading rate. At the same time, the rotation of the upper sprocket 8 will cause a hesitation in the passage of the film to the film gate. This decrease in rate of traverse of the film cooperates with the increased rate at the sprocket 12 to shorten the film length and provide "free breathing" of the film. It will be obvious that this cooperative effect is additive and that the net displacement of the film between the sprockets is approximately twice the actual tangential rotation of one of the sprockets effected by the movement of the sliding yoke.

As is obvious from the above explanation, the automatic threading is achieved in a relatively simple manner, there being only one cycle of movement when passing from the threading position to the running position. The apparatus has been further found to require little maintenance, is economical to manufacture, dependable and easy to operate. It additionally presents the advantage of easy film removal since rotation of the lens away from the film gate and movement of the film retaining means 14 and 16 away from the sprockets 8 and 12 permits freedom of access to the film. This is particularly valuable for editing purposes and overcomes a disadvantage prevalent in prior automatic threaders. Such prior devices with their cumbersome loop formers necessitated running of the film completely through the projector in order to reach an intermediate section for editing, or removal. The arrangement of lens and film retainers further permits loading of the film at an intermediate point in the reel, likewise an advantage absent in prior automatic projectors.

It will be understood that various modifications may be made in the film threading mechanism of this invention without departing from the spirit of the invention, particularly as defined in the following claims.

We claim:

1. An automatic film threading mechanism for a motion picture projector comprising a film gate associated with a projection aperture, means for intermittently advancing film past said projection aperture, said threading mechanism having a threading position and a running position and including stationary, arcuate loop forming means located on either side of said film gate, first sprocket means rotatable about a stationary axis for feeding film past one of said loop formers and to said intermittent advancing means, second sprocket means rotatable about a stationary axis for receiving film passed from said advancing means to said other loop former; motor means, a sliding worm adapted to be rotated about its axis by said motor means, worm gears operatively associated with said sliding worm and connected to each of said sprocket means, and means to slide said worm alternately back and forth from its threading position to its running position and from its running position to its threading position, whereby rotation of said worm by said motor causes each of said sprocket means to be rotated in the same direction to permit advancing of film therethrough and sliding of said sliding worm causes a reduction in the rotational speed of said first sprocket means.

2. An automatic film threading mechanism according to claim 1 wherein a sliding yoke supports said sliding worm, and the means to slide said yoke includes pressure responsive guide means adapted to guide film passing from said second sprocket means, pin means secured to said guide means, a lever secured to said pin means and latch means formed in said lever; and means to position said latch means on said yoke, whereby said yoke and supported worm are locked in threading position; and wherein exertion of pressure on said guide means causes said pin means and lever means to move, releases said latch means from said yoke and permits sliding of said yoke and supported worm to running position.

3. An automatic film threading mechanism according to claim 2 wherein a flexibly mounted pressure plate is mounted in a normal position adjacent said aperture and further including abutment means adapted to force said flexibly mounted pressure plate away from its normal position adjacent said aperture, said abutment means being located on a lift lever, a bearing surface located on said lift lever and bearing means formed on said sliding yoke whereby said abutment means forces said pressure plate away from its normal position due to the action of said bearing means on said bearing surface when said sliding yoke is in threading position, and said pressure plate is returned to its normal position when said yoke slides to running position.

4. An automatic film threading mechanism for a motion picture projector comprising a film gate associated with a projection aperture, means for intermittently advancing film past said projection aperture, said threading mechanism having a threading position and a running position and including stationary, arcuate loop forming means located on either side of said film gate, first sprocket means rotatable on a shaft fixed about a stationary axis for feeding film past one of said loop formers and to said intermittent advancing means, second sprocket means rotatable on a shaft fixed about a stationary axis for receiving film passed from said advancing means to said other loop former; motor means, a sliding worm adapted to be rotated about its axis by said motor means, a first worm gear operatively associated with said sliding worm and fixedly secured to the shaft of said first sprocket means, a second worm gear operatively associated with said sliding worm and loosely held on the shaft of said second sprocket means, a face gear fixedly secured to the shaft of said second sprocket means, a pinion gear operatively connecting said second worm gear and said face gear, and means to slide said worm alternately back and forth from its threading position to its running position and from its running position to its threading position, whereby rotation of said worm by said motor causes each of said sprocket means to be rotated in the same direction to permit advancing of film therethrough and sliding of said sliding worm causes a reduction in the rotational speed of said first sprocket means.

5. An automatic film threading mechanism for a motion picture projector of the type having means for intermittently advancing film past a projection aperture, including a flexibly mounted pressure plate mounted in a normal position adjacent said aperture, first and second stationary loop forming means located above and below said aperture, film feeding means located on a stationary axis for introducing film into said first loop forming means and film receiving means located on a stationary axis for receiving film from said second loop forming means, driving means for rotating said feeding means and said receiving means in a manner whereby said film may be continuously advanced between said aperture and said pressure plate, means associated with said driving means adapted to reduce the rotational speed of said feeding means whereby the length of film between said receiving means and said feed means may be shortened, said associated means being further connected to abutment means adapted to force said flexibly mounted pressure plate away from its normal position adjacent said aperture, said abutment means being further adapted to return said pressure plate to its normal position adjacent said aperture when said associated means effects said reduction in rotational speed of said feeding means.

6. An automatic film threading mechanism according to claim 5 wherein said associated means adapted to reduce the rotational speed of said feeding means includes guide means adapted to guide film passing from said receiving means, said guide means being operatively connected to said driving means and being pressure responsive, whereby exertion of pressure on said guide means reduces the rotational speed of said feeding means and causes said abutment means to return said pressure plate to its normal position adjacent said aperture.

7. An automatic film threading mechanism for a motion picture projector of the type having means for intermittently advancing film past a projection aperture, including first and second stationary loop forming means located above and below said aperture, film feeding means located on a stationary axis for introducing film into said first loop forming means and film receiving means located on a stationary axis for receiving film from said second loop forming means, driving means for rotating said feeding means and said receiving means in a manner whereby said film may be continuously advanced past said aperture, and means associated with said driving means operable in response to engagement by said film and operable after said film is gripped by said receiving means to reduce the rotational speed of said feeding means whereby the length of the film between said receiving means and feeding means may be shortened.

8. An automatic film threading mechanism for a motion picture projector comprising a film gate associated with a projection aperture, means for intermittently advancing film past said projection aperture, said threading mechanism having a threading position and a running position and including stationary, arcuate loop forming means located on either side of said film gate, first sprocket means rotatable about a stationary axis for feeding film past one of said loop forming means and to said intermittent advancing means, second sprocket means rotatable about a stationary axis for receiving film passing from said advancing means to said other loop forming means, a driving means including a worm gear and sprocket drive gears operatively associated therewith, motor means for rotating said worm gear whereby said driving means are adapted to rotate each of said sprocket means in the same direction to advance said film past said aperture and means operating in response to the presence of said film in said mechanism and when said film is gripped by said second sprocket means to reduce the rotational speed of said first sprocket means whereby the length of the film between said first sprocket means and said second sprocket means may be shortened.

9. An automatic film threading mechanism for a motion picture projector of the type having means for intermittently advancing film past a projection aperture, including first and second stationary loop forming means located above and below said aperture, film feeding means located on a stationary axis for introducing film into said first loop forming means and film receiving means located on a stationary axis for receiving film from said second loop forming means, driving means for rotating said feeding means and said receiving means in a manner whereby said film may be continuously advanced therethrough, and means associated with said driving means for reducing the rotational speed of said feeding means whereby the length of the film between said receiving means and feeding means may be shortened, said associated means including guide means adapted to guide film passing from said receiving means, said guide means being operatively connected to said driving means and being pressure responsive whereby exertion of pressure on said guide means operates to effect said reduction in rotational speed.

10. An automatic film threading mechanism according to claim 9, including pivotable film retaining means associated with said feeding means and said receiving means and wherein said loop forming means consists of means located on one side only of film within said projector whereby said film is readily removed from said projector.

11. An automatic film threading mechanism according to claim 9 wherein said driving means is adapted to operate at a threading speed during threading of said film into the projector and is adapted to operate at a running speed during projection of the film, means for changing the speed of said driving means from said threading speed to said running speed, and wherein said guide means is also operatively connected to said last mentioned means whereby exertion of pressure on said guide means also operates to change the speed of said driving means from threading speed to running speed.

12. An automatic film threading mechanism for a motion picture projector comprising a film gate associated with a projection aperture, means for intermittently advancing film past said projection aperture, said threading mechanism having a threading position and a running position and including stationary, arcuate loop forming means located on either side of said film gate, first sprocket means rotatable about a stationary axis for feeding film past one of said loop forming means to said intermittent advancing means, second sprocket means rotatable about a stationary axis for receiving film passed from said advancing means to said other loop forming means, motor means, means shiftable between a threading position and a running position and driven by said motor means, means operatively associated with said shiftable means and connected to said first and second sprocket means, and means for shifting said shiftable means from said threading position to said running position and from said running position to said threading position, operation of said shiftable means by said motor causing each of said first and said second sprocket means to be rotated in the same direction to permit advancing of film therethrough and shifting of said shiftable means from said threading position to said running position causing a reduction in the rotational speed of said first sprocket means.

13. An automatic film threading mechanism in accordance with claim 12 wherein shifting of said shiftable means from said threading position to said running position also causes an increase in the rotational speed of said second sprocket means.

14. An automatic film threading mechanism for a motion picture projector of the type having means for intermittently advancing film past a projection aperture, including first and second stationary loop forming means located above and below said aperture, film feeding means located on a stationary axis for introducing film into said first loop forming means and film receiving means located on a stationary axis for receiving film from said second loop forming means, driving means for rotating said feeding means and said receiving means in a manner whereby said film may be continuously advanced past said aperture, and means associated with said driving means operable in response to engagement by said film and operable after said film is gripped by said receiving means to reduce the rotational speed of said feeding means and to increase the rotational speed of said receiving means whereby the length of film between said receiving means and said feeding means may be shortened.

15. In motion picture apparatus including a film gate through which a filmstrip is to be intermittently advanced, a film supply, a film take-up, and means for feeding and guiding a filmstrip over a given path from said supply, through said gate and to said take-up, the combination comprising:
 (a) a film feeding sprocket in advance of said gate;
 (b) means for continuously rotating said sprocket in one direction to feed filmstrip from said supply to said gate;
 (c) means contacted by the filmstrip in its travel between said sprocket and said gate during threading of the apparatus for guiding the filmstrip in a curved path from said sprocket to said gate;
 (d) means for sensing the passage of said filmstrip from said gate; and
 (e) means actuated by said means sensing the passage of filmstrip from said gate for momentarily changing the rate of operation of said film feeding sprocket to displace the filmstrip from engagement with said guiding means.

References Cited

UNITED STATES PATENTS

| | | | |
|---|---|---|---|
| 1,309,990 | 7/1919 | Uebelmesser | 88—17 |
| 1,827,588 | 10/1931 | Kellogg | 226—40 |
| 2,095,831 | 10/1937 | Philips | 88—16.2 |
| 2,203,655 | 6/1940 | Lechleitner et al. | 88—17 |
| 2,228,092 | 1/1941 | Sperry | 226—83 |

FOREIGN PATENTS

| | | |
|---|---|---|
| 441,160 | 1/1936 | Great Britain. |
| 496,442 | 11/1938 | Great Britain. |

M. HENSON WOOD, JR., *Primary Examiner.*

WILLIAM MISIEK, GRANVILLE Y. CUSTER, JR., ERNEST A. FALLER, RAPHAEL M. LUPO,
*Examiners.*

J. R. DUNCAN, C. J. BORUM, A. T. McKEON, R. YOST, R. A. SCHACHER, *Assistant Examiners.*